April 28, 1925.
E. G. SMITH
1,535,501
AXLE TRANSMISSION
Filed Aug. 18, 1924
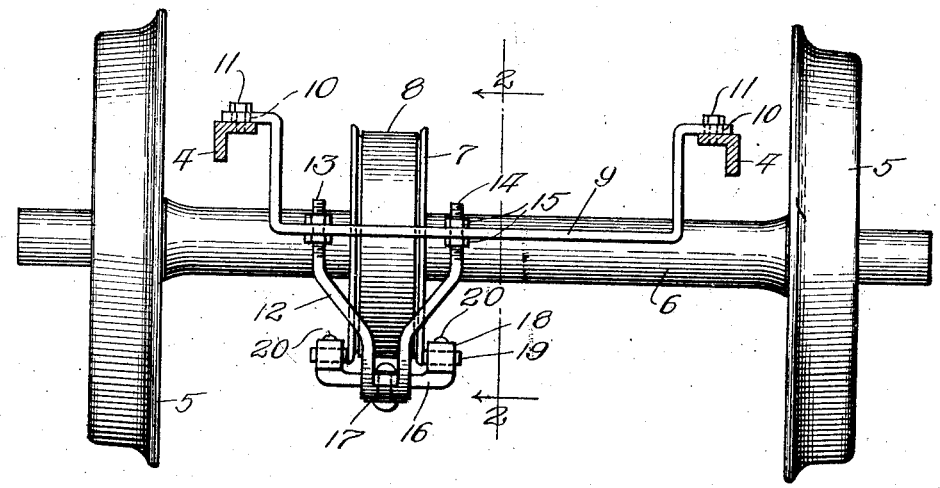
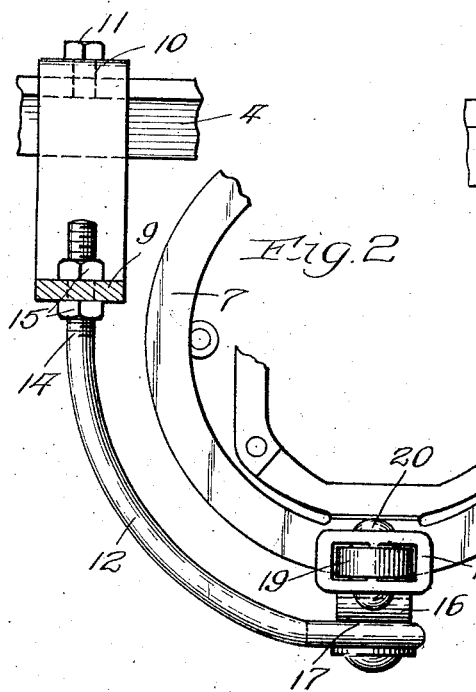
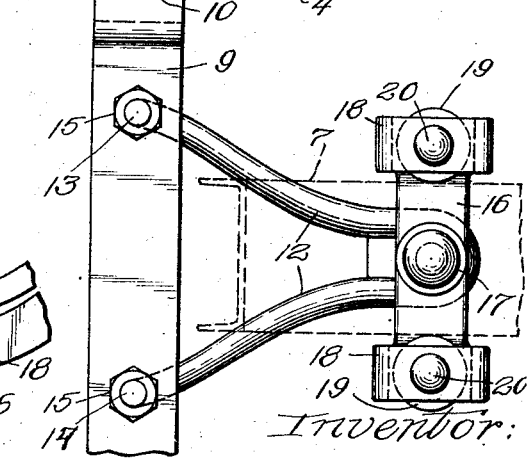
Inventor:
Eugene G. Smith,
By Glenn S. Noble Atty.

Patented Apr. 28, 1925.

1,535,501

UNITED STATES PATENT OFFICE.

EUGENE G. SMITH, OF CHICAGO, ILLINOIS.

AXLE TRANSMISSION.

Application filed August 18, 1924. Serial No. 732,765.

*To all whom it may concern:*

Be it known that I, EUGENE G. SMITH, a citizen of the United States, residing at Chicago, in the county of Cook and State of Illinois, have invented certain new and useful Improvements in Axle Transmissions, of which the following is a specification.

In axle transmissions which I have heretofore produced for driving generators for car lighting I have utilized a universal pulley which is secured to the car axle for driving a generator belt. As a pulley which is mounted for universal movement may vibrate or swing in any direction with respect to the axle it becomes necessary to hold such pulley or at least the driving rim portion thereof in substantially vertical position so that it will at all times be in proper alignment with the belt for driving the same. It is of course understood that in such car lighting apparatus the generator is mounted on the car body and the pulley is mounted on the car axle so that when the trucks swing with respect to the body the pulley tends to swing out of alignment with the belt. With my improved apparatus such tendency is overcome by the use of the universal pulley.

Under standard practice the car wheels are rigidly secured to the axles and the axles are allowed more or less longitudinal play in their bearings on the truck frames. Such truck frames are also made in large variety of designs or styles.

The present invention relates particularly to means for guiding or holding universal pulleys in proper position.

The objects of this invention are to provide an improved car axle transmission having novel means for guiding or supporting the universal pulley; to provide a universal pulley mounted on a car axle with guide means at the lower portion of the pulley; to provide means for adjusting the guide wheels for different sized cars or trucks; and in general to provide such an improved device as will be described more fully hereinafter.

In the accompanying drawings illustrating this invention,

Figure 1 is a front view showing a car axle and wheels and a portion of the frame with my improved guide mounted thereon;

Figure 2 is an enlarged sectional detail taken on the line 2—2 of Figure 1; and

Figure 3 is a plan view. Parts are broken away or shown diagrammatically in the various views for convenience in illustration.

As shown in these drawings the truck frame 4 may be of any ordinary or preferred form of construction and is carried by the wheels 5 and axle 6 in the usual manner. The universal pulley 7 is mounted on the axle 6 and drives a belt 8 to the generator (not shown). A bar 9 is mounted on the side members of the truck frame and extends across the frame substantially parallel to the axle 6. In order to allow for the lateral movement of the wheels and axle with respect to the frame, the bar 9 is preferably movable with respect to the frame and may be guided or controlled by the wheels and axle as shown in my prior application filed April 17, 1922, Serial No. 554,255, or may be mounted on the frame as shown in Figures 1 and 3. In this case the bar is provided with slots 10 which engage with bolts 11 in the frame and allow for a limited longitudinal movement of the bar. This bar may also be straight or bent in order to accommodate it to different truck frames but in this case it is shown with the central portion somewhat lower than the ends thereof. A support 12 is secured to the bar 9 for carrying the guide members for the pulley 7. This support is shown as being bifurcated. The two branches 13 and 14 pass through holes in the bar 9 and are threaded to receive the fastening nuts 15 whereby the arm or support may be adjusted vertically. A bar or bracket 16 is pivoted at 17 to the forwardly projecting portion of the arm 12 and is arranged so that it may swing in a horizontal plane. The outer ends of this swivel bracket have bearings 18 for receiving the guide rollers 19 which are mounted on pins 20. The bearings 18 are preferably made in the form of loops so that they extend around the wheels or rollers 19 but allow them to project a sufficient distance to engage with the sides of the outer rim portion of the pulley 7. The guide wheels or rollers 19 are preferably located at the lowermost portion of the pulley or in such position as to hold it substantially vertical. By means of this arrangement it will be seen that I provide a swivel bracket or guide at the bottom of the universal wheel or pulley instead of at the top as shown in my prior application. This is more desirable in connection with certain types of cars than the overhead type of guide. Furthermore the vertical adjustment provides means whereby the same guide may be utilized for different sized pulleys or to compensate for a variation in the mounting of the apparatus. Having thus described my invention, what I claim and desire to secure by Letters Patent is:

1. The combination with a railway car truck having the usual wheels, of a transverse bar mounted on the truck frame and adapted to have limited longitudinal movement to compensate for the lateral movement of the wheels and axles with respect to the frame, an arm mounted on said bar and projecting below the axle, a universal pulley mounted on said axle and means on the arm for engagement with the rim of the pulley for holding it in normal position.

2. The combination with a railway car truck, of a bar mounted on the truck frame parallel to one of the axles and adapted to have a limited longitudinal movement to compensate for the relative movement of the axle with respect to the frame, a pulley mounted for universal movement on the axle, an arm adjustably secured to said bar and projecting underneath the pulley, a bracket pivotally mounted on the arm and guide rollers mounted in the bracket and adapted to engage with the sides of the rim of the pulley.

3. The combination with a car truck, of a transverse bar having slots therein, bolts passing through said slots and engaging with the truck frame, a universal pulley mounted on the truck axle and means connected with said bar for holding the pulley in substantially vertical position.

4. The combination with a car truck having the usual wheels and axles, of a bar secured to the truck frame, an arm adjustably secured to the bar and projecting below the axle, a universal pulley mounted on the axle, a swivel bracket secured to the arm and rollers on the bracket for engagement with the sides of the pulley.

5. A guide for a universal axle transmission pulley, comprising rollers adapted to engage with the pulley at the lower portion thereof, a bracket having closed bearings for said rollers, a bent arm, means for pivoting the bracket on the arm, said arm having upwardly extending branches, a cross bar having holes for receiving said branches and nuts for engagement with the branches for adjusting the arm.

6. In an apparatus of the character described, the combination of a bar, means for adjustably securing the bar to a truck frame, a bent arm adjustably secured to the bar, a bracket pivotally secured to the arm and having bearings in the end thereof, and rollers mounted in said bearings and adapted to engage with a transmission pulley, substantially as described.

EUGENE G. SMITH.